United States Patent [19]

Brown

[11] Patent Number: 4,999,170
[45] Date of Patent: Mar. 12, 1991

[54] METHOD FOR REMOVING SODIUM OXALATE FROM CAUSTIC ALUMINATE LIQUORS

[75] Inventor: Neil Brown, Bonn, Fed. Rep. of Germany

[73] Assignee: Vereinigte Aluminum-Werke Aktiendesellschaft, Fed. Rep. of Germany

[21] Appl. No.: 411,188

[22] Filed: Sep. 20, 1989

Related U.S. Application Data

[63] Continuation of Ser. No. 202,982, Jun. 3, 1988, abandoned.

[51] Int. Cl.$^5$ ............................................. C01F 7/06
[52] U.S. Cl. .................................... 423/112; 423/121; 423/122
[58] Field of Search .................... 423/112, 121, 122

[56] References Cited

U.S. PATENT DOCUMENTS

| | | | |
|---|---|---|---|
| 3,372,985 | 3/1968 | Roberts, Jr. et al. | 423/130 |
| 3,649,185 | 3/1972 | Sato et al. | 423/121 |
| 3,899,571 | 8/1975 | Yamada et al. | 423/130 |
| 4,038,039 | 7/1977 | Carruthers et al. | 423/122 |
| 4,201,749 | 5/1980 | Yamada et al. | 423/121 |
| 4,215,094 | 7/1980 | Inao et al. | 423/121 |
| 4,263,261 | 4/1981 | Yamada et al. | 423/121 |
| 4,275,042 | 6/1981 | Lever | 423/121 |
| 4,275,043 | 6/1981 | Gnyra | 423/121 |
| 4,581,207 | 4/1986 | Bush et al. | 423/122 |
| 4,597,952 | 7/1986 | Fabre et al. | 423/121 |
| 4,668,486 | 5/1987 | Brown et al. | 423/121 |

FOREIGN PATENT DOCUMENTS 2405901 11/1979 France .

OTHER PUBLICATIONS

G. Lever, "Some Aspects of the Chemistry of Bauxite Organic Matter on the Bayer Process: The Sodium Oxalate-Humate Interaction" (vol. 13) (1983).
N. Brown et al., "The Behaviour of Sodium Oxalate in a Bayer Alumina Plant", 2/22-24/80.
Yamada et al, "Behavior of Organic Substances in the Bayer Process" (1973).

*Primary Examiner*—Melvyn J. Andrews
*Attorney, Agent, or Firm*—Darby & Darby

[57] ABSTRACT

A method for removing sodium oxalate from a caustic aluminate liquor produced using the Bayer process is disclosed which includes the steps of initially washing all the product aluminum trihydroxide obtained from the precipitation circuit to remove any crystalline sodium oxalate, thereby preventing any further sodium oxalate precipitation within the aluminum trihydroxide precipitators. This causes the dissolved sodium oxalate concentration to rise to a level which is conducive to economic removal of sodium oxalate by side-stream crystallization, without requiring a costly evaporation step. The sodium oxalate may be removed in an amount equal to the new sodium oxalate formed during fresh bauxite digestion, thus maintaining a steady dissolved concentration of sodium oxalate during aluminum trihydroxide precipitation. In addition, the aluminum trihydroxide precipitation circuit may further be stabilized in the crystalline oxalate-free condition by the addition of small amounts of an organic polymer.

7 Claims, 1 Drawing Sheet

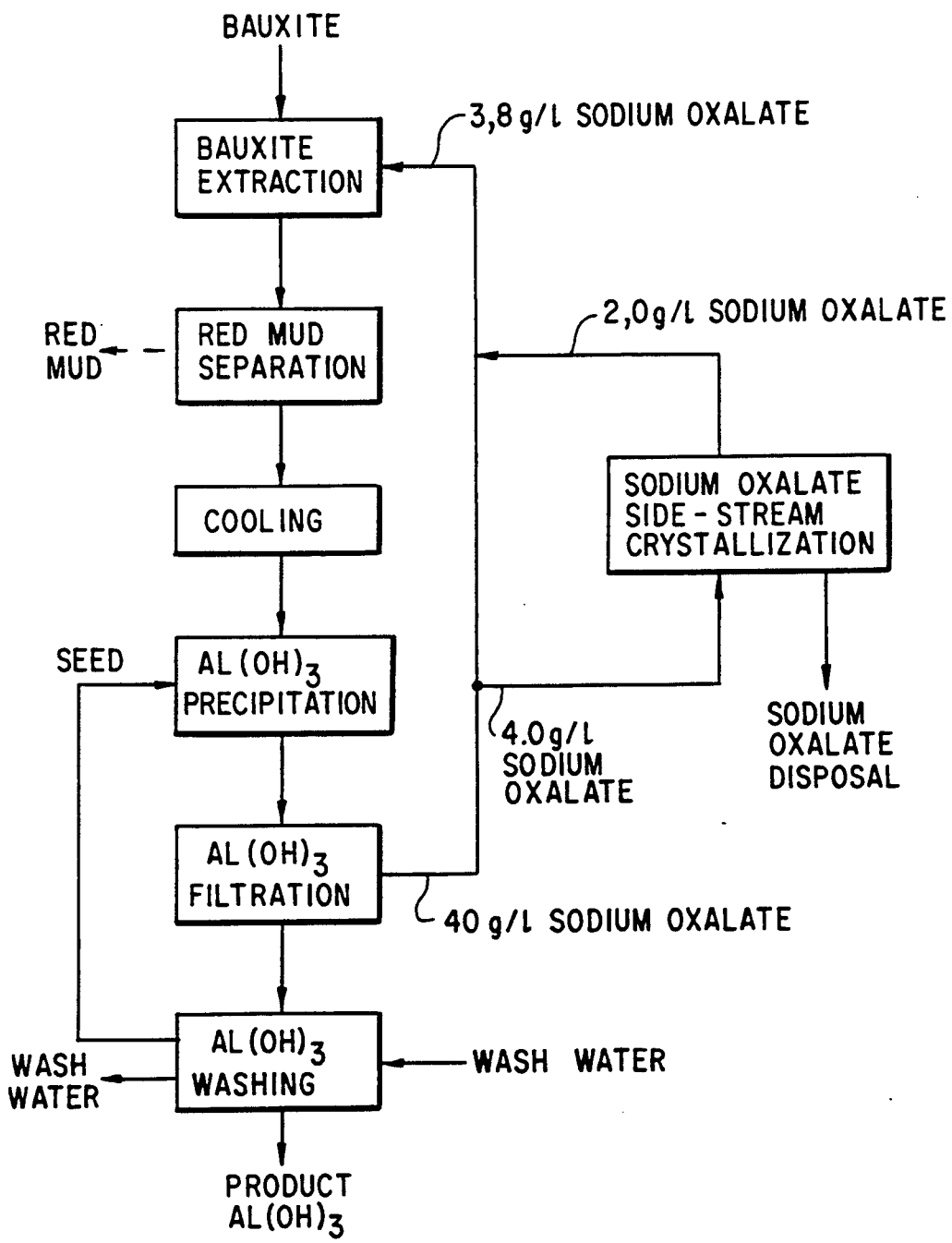

METHOD FOR REMOVING SODIUM OXALATE FROM CAUSTIC ALUMINATE LIQUORS

This is a continuation of application Ser. No. 202,982, filed June 3, 1988, now abandoned.

TECHNICAL FIELD

The present invention relates to a method for removing sodium oxalate from the caustic aluminate liquors of the Bayer process for producing alumina from bauxite.

BACKGROUND OF THE INVENTION

In the Bayer process, bauxite is contacted with recycled caustic aluminate liquor at elevated temperatures and pressures to extract the alumina content of the bauxite. The resulting slurry thus contains dissolved alumina and undissolved red mud (i.e., iron oxides, silicates, titanium oxide, etc.). The red mud is separated leaving a clear caustic aluminate solution known as "pregnant liquor" which is then seeded with aluminum trihydroxide to precipitate approximately half of the dissolved alumina content. The precipitated aluminum trihydroxide is then separated from the caustic aluminate solution. A portion of the precipitated aluminum trihydroxide is recycled to be used as seed for subsequent precipitation of aluminum trihydroxide and the remainder is recovered as product. The remaining caustic aluminate solution (hereinafter referred to as "spent liquor") is either recycled in the process for further alumina recovery as it is, or is in part concentrated by evaporation prior to recycling to the bauxite extraction step.

The bauxite used in the Bayer process contains organic substances which dissolve wholly or in part during bauxite digestion. The organic substances degrade to lower molecular weight compounds under the influence of the high caustic concentration and elevated temperatures experienced during bauxite digestion. Thus, the Bayer liquor may include various organic carbon compounds ranging from high molecular weight humic-type compounds to final degradation products such as sodium oxalate.

Sodium oxalate presents a special organics problem in that it is the only one of the many degradation products formed which accumulates to a concentration exceeding its solubility in solution. Caustic aluminate solutions are thus supersaturated with respect to sodium oxalate and are, to some extent, stabilized in this condition by the presence of the other organic carbon compounds in solution.

Sodium oxalate is thus a major impurity in the caustic aluminate liquor of the Bayer process. As long as it stays dissolved in solution, sodium oxalate is considered to be relatively harmless. Difficulties arise however when the dissolved sodium oxalate crystallizes at the temperatures and caustic concentrations employed at the end of the precipitation cycle of the Bayer process, i.e., the precipitation of product aluminum trihydroxide. The crystalline sodium oxalate which forms can interfere with particle agglomeration and stimulate the formation of fine new crystals of aluminum trihydroxide. Thus, the presence of crystalline sodium oxalate has a deleterious effect on the particle size of the product aluminum trihydroxide. Moreover, the presence of crystalline sodium oxalate can cause difficulties in the filtration of aluminum trihydroxide slurries.

A characteristic of modern alumina plants is that the aluminum trihydroxide precipitation circuit is divided into two parts. In the first part, the finer aluminum trihydroxide particles are subjected to relatively rapid size enlargement by an agglomeration mechanism whilst in the second part the agglomerates are consolidated into strong particles with crystal growth the main operating mechanism. The aluminum trihydroxide particles subjected to the agglomeration process are generally washed free of any crystalline sodium oxalate prior to precipitation, whereas aluminum trihydroxide entering the growth precipitators (i.e., agglomerated particles + recycled coarse material) is not subjected to any washing procedure.

The water used to wash aluminum trihydroxide seed and product particles can contain significant amounts of dissolved sodium oxalate. Typically, aluminum trihydroxide in the unwashed condition may contain 0.1–1.0% sodium oxalate, with respect to the overall quantity of aluminum trihydroxide. By concentrating wash waters by wash-water evaporation, it is possible to subsequently recrystallize the sodium oxalate which can then be separated and disposed of. Thus, seed washing constitutes a recognized method of removing sodium oxalate from the Bayer process (see, for example, Roberts et al., U.S. Pat. No. 3,372,985). It can be appreciated, however, that sodium oxalate removal by the 'Seed Washing', process can only function when crystalline sodium oxalate is already present in the aluminum trihydroxide precipitation circuit. In other words, the aluminum trihydroxide precipitation circuit must be, to some degree, in difficulty before 'Seed Washing' can work.

Other techniques have been developed and are used for removing sodium oxalate from the caustic aluminate liquors of the Bayer process. These generally involve seeding systems of some type and exploit the well-known sodium oxalate solubility relationships, particularly the temperature and caustic concentration dependencies (see, for example, Sato et al., U.S. Pat. No. 3,649,185 and Fujiike et al., French Patent No. 2,405,901).

Probably the most effective approach, at least in terms of consistently removing sufficient sodium oxalate from the process to maintain sodium oxalate, in both the dissolved and solid states, at acceptably low levels, is side-stream crystallization of sodium oxalate by seeding partially concentrated spent liquor by liquor evaporation, as opposed to wash-water evaporation (see, for example, Carruthers et al., U.S. Pat. No. 4,038,039 and Yamada et al., U.S. Pat. No. 4,263,261). The long-standing problem of the progressive contamination and deactivation of the sodium oxalate seed crystals by the other organic carbon compounds present in solution has been overcome by the employment of a suitable wash process which regenerates the activity of the seed crystals and maintains a crystal form suitable for filtration and separation of the crystalline sodium oxalate (see, for example, Yamada et al., Light Metals Conf. Proceedings (1973) 745–754). Alternatively, techniques have been developed for removing the harmful organic contaminants prior to seeded crystallization of sodium oxalate (see, for example, Gnyra, U.S. Pat. No. 4,275,043 and Lever, U.S. Pat. No. 4,275,042).

Thus, side-stream crystallization of sodium oxalate from caustic aluminate liquor suitably concentrated by partial evaporation provides an attractive alternative to the 'Seed Washing' process for sodium oxalate removal.

Not all alumina plants, however, are equipped with liquor evaporators (in itself a desirable goal due to the energy intensive nature of liquor evaporation). This applies particularly to alumina plants operating the tube digestion system.

Therefore, what is needed in the art is a method for sodium oxalate removal which achieves at least the equivalent to that of seeded crystallization of partially evaporated liquor without the need to preconcentrate using liquor evaporation.

SUMMARY OF THE INVENTION

The present invention has several objects including, but not limited to, the following:

to provide a new method for removing sodium oxalate from caustic aluminate liquors of the Bayer process in such a way that partial evaporation of the liquor prior to sodium oxalate crystallization is not necessary;

to provide a new method for removing sodium oxalate from caustic aluminate liquor of the Bayer process in such a way that contamination of the aluminum trihydroxide precipitation circuit with crystalline sodium oxalate no longer occurs;

to provide a method of enhancing the stability of aluminum trihydroxide precipitation with respect to the elevated concentration of dissolved sodium oxalate by the addition, as and if required, of small amounts of a suitable organic polymer.

Accordingly, a process for removing sodium oxalate from the caustic aluminate liquor of the Bayer process is disclosed which comprises the steps of:

washing essentially all of the product aluminum trihydroxide of the precipitation circuit free of crystalline sodium oxalate;

allowing the dissolved sodium oxalate concentration of the main process liquor stream to rise to a level which enables side-stream crystallization to economically remove the required amount of sodium oxalate and at the same time maintain the aluminum trihydroxide precipitation circuit free of crystalline sodium oxalate; and, if required, enhancing the stability of the aluminum trihydroxide precipitation with respect to the elevated concentration of dissolved sodium oxalate by the addition of small amounts of a suitable organic polymer.

The present invention describes a new method for achieving the aforementioned objectives. This is done by initially washing all of the aluminum trihydroxide free of crystalline sodium oxalate. The dissolved oxalate concentration of the main process liquor stream then rises to a level which enables side-stream crystallization to economically remove sufficient sodium oxalate to enable steady operation of the plant aluminum trihydroxide precipitation circuit free of crystalline sodium oxalate. Moreover, it has been found that the stability of the aluminum trihydroxide precipitation with respect to the elevated dissolved sodium oxalate concentration can be enhanced, as and if necessary, by the addition of small amounts of a suitable organic polymer.

BRIEF DESCRIPTION OF THE DRAWINGS

The Figure is a schematic illustration of the inventive method for removing sodium oxalate from caustic aluminate liquors of the Bayer process.

DETAILED DESCRIPTION OF THE INVENTION

The present invention describes a method for removing sodium oxalate from a caustic aluminate liquor of the Bayer process by side-stream crystallization while avoiding the need to partially evaporate the liquor prior to sodium oxalate crystallization.

A typical distribution of sodium oxalate in an aluminum trihydroxide precipitation circuit of an alumina plant which uses the seed washing system as the major means of sodium oxalate removal is as follows:

| dissolved sodium oxalate | 2.6–3.0 g/l |
| crystalline sodium oxalate | 0.5–1.0%[1] |

[1]calculated with respect to aluminum trihydroxide present at 300–350 g/l.

At a caustic concentration of about 130 g/l (as $Na_2O$), the presence of the 0.5–1.0% of crystalline sodium oxalate provides a steady outlet for about 0.2 g/l of sodium oxalate from the main process liquor by seeded crystallization. At steady state, this same 0.2 g/l corresponds approximately to the input of sodium oxalate to the process from the organic carbon substances which enter the process with the starting bauxite.

Thus, it has been found that when essentially all the aluminum trihydroxide is washed free of the crystalline sodium oxalate, the dissolved sodium oxalate concentration can rise to and maintain a concentration of at least 4.0 g/l without crystallization of sodium oxalate occurring under aluminum trihydroxide precipitation conditions.

Using the well-known solubility relationships for sodium oxalate in the caustic aluminate liquor of the Bayer process, it can be readily calculated that for a solution concentration of 130 g/l $Na_2O_{free}$ and a temperature of 60° C., the supersaturation (i.e., the crystallization driving force) with respect to sodium oxalate has been increased by a factor of about 100% (i.e., from about 75% to about 150% supersaturated).

$$C_{OXALATE} \text{ SUPERSATURATION} = C_{OXALATE} \text{ CONCENTRATION IN LIQUOR} - C_{OXALATE} \text{ EQUILIBRIUM SOLUBILITY}$$

$$C_{OXALATE} \text{ EQUILIBRIUM SOLUBILITY} = 7.62 \exp.[0.012\ T - 0.016\ FS - 0.011\ CO_3^{2-}]$$

where

T is liquor temperature in ° C.

F is liquor free soda concentration (expressed as g/l $Na_2O$)

$CO_3^{2-}$ is liquor carbonate concentration (expressed as g/l $Na_2O$)

(See Brown et al., Light Metals Conference Proceedings (1980) 107).

According to the method of the prior art, the spent liquor of the Bayer process would require to be concentrated by partial evaporation from 130 g/l to 156 g/l $Na_2O_{free}$, i.e., an increase in liquor concentration of 20% in order to obtain the same increase in supersaturation with respect to sodium oxalate.

When caustic aluminate liquor at 4.0 g/l sodium oxalate is treated in side-stream crystallization at 60° C. with a 50 g/l seed charge of previously crystallized sodium oxalate with a retention time of 30-60 min., the dissolved sodium oxalate concentration can be lowered to <2.0 g/l.

Thus, by continuously treating one tenth of the plant liquor flow (taken at the spent liquor stage following aluminum trihydroxide precipitation), the removal rate essentially matches the 'input' of sodium oxalate to the process.

It is recognized that operating at elevated concentrations of dissolved sodium oxalate in the complete absence of crystalline sodium oxalate is a fundamentally different situation from that where crystalline sodium oxalate is present in the aluminum trihydroxide precipitation circuit. There is no longer the easy outlet for sodium oxalate due to the presence of seed crystals. It is thus important to establish how high the sodium oxalate concentration of the process liquor can be allowed to rise without resulting in a sudden explosion of new sodium oxalate crystals, which must be avoided.

Appropriate experiments carried out at the laboratory level show that the dissolved sodium oxalate concentration can rise to 4.5 g/l (i.e., approaching 200% supersaturated) before stimulated nucleation of sodium oxalate occurs due to the presence of the aluminum trihydroxide particles.

Further experimental work at the laboratory level has shown that the addition of small amounts of a sodium polyacrylate (such as Nalco product M8081) hinders the stimulated nucleation of sodium oxalate by solid aluminum trihydroxide.

The method of the present invention is illustrated in the Figure which shows a schematic diagram of the main Bayer process with the side-stream sodium oxalate removal system of the present invention. Bauxite is first fed to an extractor and combined with a spent caustic aluminate liquor. During bauxite digestion, alumina is dissolved as well as other organic compounds. The resulting slurry is then filtered, removing the undissolved impurities known as red mud, leaving a clear caustic aluminate solution rich in aluminum trihydroxide (pregnant liquor). The pregnant liquor is cooled and seed added to precipitate the aluminum trihydroxide, forming an agglomerate which is grown and strengthened to product size, and removed by filtration, leaving a spent liquor for recycle to the bauxite extractor. The product aluminum trihydroxide is then separated and water washed, preferably in a drum filter, with a portion returned as seed to the pregnant liquor, completing the precipitation circuit.

Introduced into the process is a sodium oxalate removal step wherein approximately 1/10 of the main recirculating spent caustic aluminate liquor of the Bayer process is taken for side stream crystallization. This spent liquor has an elevated sodium oxalate concentration by virtue of having washed all of the aluminum trihydroxide of the precipitation circuit free of crystalline sodium oxalate, preventing sodium oxalate crystallization in the aluminum trihydroxide precipitation circuit. Thus, the spent liquor of raised sodium oxalate concentration is brought into contact with sodium oxalate seed crystals supplied in an amount of about 50 g/l, or for an exemplary circuit, an amount at least equal to that required to crystallize at least 2 g/l sodium oxalate at a temperature of about 60° C. The residence time within the crystallizer depends upon the temperature and quantity of seed crystals used, but is optimally within the range 30-120 min.

In the flow sheet of the Figure, the present invention is shown in the form of a continuous process which is preferred, but the present invention may be operated in either a batch process or a semi-continuous process.

Next, the present invention will be described further in terms of the following examples, which are intended to illustrate the basis of the invention without limiting its scope.

EXAMPLE 1

A Bayer process spent liquor having a composition which approximately 134 g/l $Na_2O_{free}$, approximately 90 g/l $Al_2O_3$, having a slightly elevated dissolved sodium oxalate concentration of about 3.2 g/l, was introduced in aliquots of 800 ml to a series of three 1 liter capacity polyethylene bottles. To each was added 300 g/l of aluminum trihydroxide solids containing different amounts of crystalline sodium oxalate. The bottles were then closed and the slurries rotated end-over-end in a constant temperature water bath at 60° C. for 44 hours. At the end of the experiment, all solids were analyzed for the presence of crystalline sodium oxalate. The following results were obtained:

| START | END |
|---|---|
| % Crystalline Sodium Oxalate in Al(OH)$_3$ | % Crystalline Sodium Oxalate in Al(OH)$_3$ |
| 0.50 | 0.68 |
| 0.25 | 0.30 |
| <0.01 | <0.01 |

The results show that the presence of the crystalline sodium oxalate in the starting aluminum trihydroxide promotes the crystallization of further sodium oxalate during precipitation due to the seeding effect. In the absence of any measurable crystalline sodium oxalate at the start, there is no formation of new crystalline sodium oxalate, when holding the slurry for extended periods at 60° C. under aluminum trihydroxide precipitation conditions.

EXAMPLE 2

Spent liquor having the same composition as in Example 1 was adjusted to have dissolved sodium oxalate concentrations of 4.0 and 4.6 g/l respectively. The liquors were then held for extended periods at 60° C. in the presence of 200 g/l water-washed aluminum trihydroxide from the Bayer process. The experiment was carried out in the laboratory in the same way as that described in Example 1.

The results obtained were as follows:

| STARTING SODIUM OXALATE CONCENTRATION (g/l) | RESIDENCE TIME (hours) | DISSOLVED SODIUM OXALATE CONCENTRATION (g/l) | CRYSTALLINE SODIUM OXALATE IN Al(OH)$_3$ (%) |
|---|---|---|---|
| 4.0 | 20 | 4.0 | <0.01 |
|  | 36 | 3.9 | <0.01 |
|  | 46 | 4.1 | <0.01 |
| 4.6 | 16 | 4.6 | <0.01 |
|  | 24 | 4.4 | <0.01 |
|  | 36 | 4.5 | <0.01 |

In the absence of crystalline sodium oxalate in the seed Al(OH)$_3$, the results indicate that a spent liquor with a sodium oxalate concentration of up to about 4.6 g/l is stable with respect to sodium oxalate under aluminum trihydroxide precipitation conditions.

EXAMPLE 3

Spent liquor of approximately the same composition as that in Example 1 was adjusted to have a sodium oxalate composition of 4.1 g/l, and then seeded with 50 g/l of crystalline sodium oxalate (separated from the Bayer process) which had first been 'washed' free of other organic contaminants by exposing the sodium oxalate crystals briefly, in accordance with the prior art, to a dilute caustic solution undersaturated with respect to sodium oxalate. Thus, 2-3 weight percent of the seed crystals were removed in the wash process.

Sodium oxalate crystallization was carried out on the seed crystals in cyclic experiments at 60° C. for 60 min. with periodic washing of the sodium oxalate crystals according to the aforementioned procedure. Dissolved sodium oxalate concentration and filtration time of the slurry were measured at the end of each cycle.

The following results were obtained:

| Cycle No. | Sodium Oxalate Concentration (g/l) | Filtration Time (min.) |
|---|---|---|
| 1 | 2.1 | 16 |
| 2 | 2.4 | 22 |
| 3 | 2.3 | 34 |
| Oxalate 'washed' | — | 12 |
| 4 | 2.2 | 23 |
| 5 | 2.3 | 50 |
| Oxalate 'washed' | — | 15 |
| 6 | 1.9 | 37 |

The filtration time of the starting 'washed' sodium oxalate was 13 min.

The results indicate that the 50 g/l sodium oxalate seed charge was barely sufficient to achieve the required decrease in dissolved sodium oxalate concentration of 2 g/l. Here, an increase in the seed charge or increased residence time would have lowered the dissolved sodium oxalate concentration to within the range 1.5-2.0 g/l. The expected poisoning effect of adsorbed organics did not seriously interfere with oxalate crystallization. Rather, the effect was greater on the measured filtration time after crystallization, the filtration time responding more positively to the applied 'wash' procedure. Branching of the oxalate crystals in response to adsorbed organics is believed to be responsible for poorer filtration, with the branch structures collapsing under the influence of the 'wash' procedure.

EXAMPLE 4

Spent liquor (composition: Na$_2$O$_{free}$ 135 g/l; Al$_2$O$_3$ 92 g/l) was adjusted to a sodium oxalate concentration of 4.8 g/l at 70° C. 500 ml of this liquor was introduced into each of three polypropylene vessels. To two of the vessels was added 100 g of washed Al(OH)$_3$ and to one of these was further added 30 mg/l (expressed as organic carbon) of sodium polyacrylate (Nalco M8081 having a molecular weight of about 4 ×10$^6$). To begin the experiment, the three vessels were closed and placed in a constant temperature water bath at 70° C. They were then rotated end-over-end at 8 RPM and the temperature lowered to 39° C. over a period of 41 hours. Samples were removed for sodium oxalate analyses as a function of time. The results were as follows:

| | | Sodium Oxalate Concentration (g/l) | | |
|---|---|---|---|---|
| Time (Hours) | Temp (°C.) | Liquor | Liquor + Al(OH)$_3$ | Liquor + AL(OH)$_3$ + Sodium Polyacrylate |
| 0 | 70 | 4.8 | 4.8 | 4.8 |
| 4 | 65 | 4.7 | 4.7 | 4.8 |
| 15 | 60 | 4.8 | 3.7 | 4.5 |
| 26 | 50 | 4.8 | 3.9 | 4.6 |
| 39 | 41 | 4.6 | 2.5 | 2.6 |

The presence of Al(OH)$_3$ stimulates the formation of new sodium oxalate crystals at a temperature of 60–65° C. When sodium polyacrylate is used, however, the onset of new crystal formation is delayed until the temperature has decreased below 50° C., i.e., until the supersaturation with respect to dissolved sodium oxalate is >200%.

EXAMPLE 5

Spent liquor (composition: 131 g/l Na$_2$O$_{free}$; 86 g/l Al$_2$O$_3$) was adjusted to a sodium oxalate concentration of 4.5 g/l at 60° C. 500 ml of liquor was introduced into each of two polypropylene vessels along with 100 g of washed Al(OH)$_3$. To one of these was further added 30 mg/l of sodium polyacrylate. The experiment was carried out at a constant temperature of 60° C. with samples removed for sodium oxalate analyses as a function of time. The results were as follows:

| | | Sodium Oxalate Concentration (g/l) | |
|---|---|---|---|
| Time (Hours) | Temp. (°C.) | Liquor + Al(OH)$_3$ | Liquor + Al(OH)$_3$ + Sodium Polyacrylate |
| 0 | 60 | 4.5 | 4.5 |
| 4 | 60 | 4.5 | 4.5 |
| 14 | 60 | 4.2 | 4.6 |
| 20 | 60 | 3.9 | 4.6 |

The results confirm that the presence of Al(OH)$_3$ in the liquor can stimulate the formation of new sodium oxalate crystals in liquor containing 4.5 g/l dissolved sodium oxalate. In the presence of added (30 mg/l) sodium polyacrylate, the spent liquor is stable with respect to sodium oxalate for at least 20 hours at 60° C. The results confirm the temperature-time dependence of the nucleation process.

EXAMPLE 6

The experiment of Example 5 was repeated under identical conditions except that unwashed Al(OH)$_3$ containing 0.89% crystalline sodium oxalate was used. The results were as follows:

| Time (Hours) | Temp. (°C.) | Sodium Oxalate Concentration (g/l) | |
|---|---|---|---|
| | | Liquor + unwashed Al(OH)$_3$ | Liquor + unwashed Al(OH)$_3$ + Sodium Polyacrylate |
| 0 | 60 | 4.5 | 4.5 |
| 4 | 60 | 4.4 | 4.2 |
| 14 | 60 | 4.2 | 4.1 |
| 20 | 60 | 4.1 | 3.8 |

The results show that the added (30 mg/l) sodium polyacrylate is ineffective in stabilizing the dissolved sodium oxalate in the liquor. Presumably, this is due to the relatively large presence of Al(OH)$_3$ solids on which the polymer adsorb thus 'diluting' its effectiveness with respect to crystalline sodium oxalate.

The addition of large amounts of polymer to reach a level where sodium oxalate crystallization is inhibited is impractical due to the resulting viscosity increase of the liquor which decreases the subsequent filtration rate of the aluminum trihydroxide slurry.

EXAMPLE 7

The experiments of Examples 5 and 6 were repeated under the same conditions except for the order of solids addition to the vessels prior to the start. In one case, 200 g/l washed Al(OH)$_3$ and 1 g/l crystalline sodium oxalate were suspended in spent liquor and then 30 mg/l of sodium polyacrylate added. In the second case, 1 g/l crystalline sodium oxalate was suspended in spent liquor, 30 mg/l of sodium polyacrylate added to the suspension followed by the 200 g/l washed Al(OH)$_3$. The results subsequently obtained at 60° C. and retention times of up to 20 hours were as follows:

| Time (Hours) | Temp. (°C.) | Sodium Oxalate Concentration (g/l) | |
|---|---|---|---|
| | | Liquor + washed Al(OH)$_3$ + Sodium Oxalate + Sodium Polyacrylate | Liquor + Sodium Oxalate + Sodium Polyacrylate + washed Al(OH)$_3$ |
| 0 | 60 | 4.5 | 4.5 |
| 4 | 60 | 4.3 | 4.6 |
| 14 | 60 | 4.1 | 4.4 |
| 20 | 60 | 3.8 | 4.4 |

The results confirm that sodium polyacrylate does inhibit crystallization of sodium oxalate in the mixed solids suspension provided the polymer molecules are given the opportunity to 'see' the crystalline sodium oxalate.

EXAMPLE 8

Bayer liquor (composition: Na$_2$O$_{free}$ 136 g/l; Al$_2$O$_3$ 118 g/l), typical of that entering the growth precipitation section of a modern alumina plant, was adjusted to a sodium oxalate concentration of 3.2 g/l and seeded with 200 g/l of washed Al(OH)$_3$, the latter having a particle size distribution typical of that of the industrial process. Precipitation tests were carried out in the previously described equipment (with a liquor volume of 500 ml in each vessel) at 60° C. for 24 hours as a function of added sodium polyacrylate (15 and 30 mg/l, expressed as organic carbon equivalent). The following results were obtained:

| Sodium Polyacrylate Addition (mg/l) | Liquor Al$_2$O$_3$ Conc'n (g/l) | Liquor Sodium Oxalate Conc'n (g/l) | Particle Size Analyses | | |
|---|---|---|---|---|---|
| | | | Wt. % >90 μm | Wt. % <45 μm | No. of Particles per g |
| 0 | 97.1 | 3.2 | 43.4 | 14.4 | 3.19 × 10$^6$ |
| 15 | 96.6 | 3.3 | 45.0 | 15.8 | 3.01 × 10$^6$ |
| 30 | 96.6 | 3.2 | 44.0 | 16.7 | 3.22 × 10$^6$ |
| Seed Al(OH)$_3$ | — | — | 46.7 | 15.6 | 3.91 × 10$^6$ |

The results indicate that the addition, in small amounts, of sodium polyacrylate under 'Growth' precipitation conditions has no significant effect on liquor productivity or particle size of the product aluminum trihydroxide.

Thus, the samples show that, provided the aluminum trihydroxide of the precipitation circuit is maintained free of crystalline sodium oxalate contamination, then the spent liquor or near spent liquor of the precipitation circuit is stable with respect to sodium oxalate at concentrations of the latter which are sufficiently high to allow an economical removal of sodium oxalate by side-stream crystallization.

The inhibiting action of sodium polyacrylate on homogeneous nucleation of sodium oxalate and crystallization of sodium oxalate seed crystals in caustic aluminate liquor is already established (see Lever, Travaux du Comite International pour l'etude des Bauxites, de l'Alumine et de l'Amuninium. Vol. 13, Nr. 18 (1983) 335-344). It is also known that sodium polyacrylate is effective at low additions (concentration of maximum effectiveness is 60 mg/l, expressed as equivalent organic carbon), and over a wide range of molecular weights.

However, as the present invention shows, sodium polyacrylate additions up to 30 mg/l are surprisingly ineffective as inhibitor of sodium oxalate crystallization where a relatively small quantity of crystalline sodium oxalate is present in admixture with a relatively large amount of crystalline Al(OH)$_3$.

In comparison with the seed washing process and the side-stream crystallization process using partially evaporated liquor, the method of the present invention is superior in that (a) no liquor is required; (b) the aluminum trihydroxide precipitation circuit of the Bayer process is completely free of contamination by crystalline sodium oxalate; and (c) the aluminum trihydroxide precipitation circuit can be stabilized in the 'crystalline oxalate-free' condition by the addition of small amounts of an organic polymer such as sodium polyacrylate.

Although the invention has been shown and described with respect to detailed embodiments, it should be understood by those skilled in the art that the present invention is not limited to the detailed description but rather includes any equivalent modifications thereto as will suggest themselves to those skilled in the art. It is therefore intended that the following claims cover such modifications as fall within the spirit and scope of the invention.

What is claimed is:

1. A process for removing sodium oxalate from a caustic aluminate liquor produced from bauxite digestion using the Bayer process, the caustic aluminate liquor including aluminum trihydroxide and sodium oxalate therein, the caustic aluminate liquor entering an aluminum trihydroxide precipitation circuit for removing the aluminum trihydroxide, leaving a spent liquor which is recycled to a bauxite digestion step, the process further including separating and removing an amount of sodium oxalate from the spent liquor, the sodium oxalate separation comprising the steps of;
   a. washing all the removed aluminum trihydroxide obtained from the precipitation circuit essentially free of crystalline sodium oxalate;
   b. adding a portion of the washed aluminum trihydroxide as seed in the precipitation circuit, the absence of crystalline sodium oxalate preventing crystallization of sodium oxalate within the precipitation circuit, the prevention of sodium oxalate crystallization raising the sodium oxalate concentration within the precipitation circuit to a level exceeding the solubility of sodium oxalate by at least 2 g/l;
   c. taking a side-stream from the spent liquor after aluminum trihydroxide precipitation and before the bauxite digestion step;
   d. adding sodium oxalate crystals as seed crystals to the side-stream, without evaporating a portion of the side-stream, thereby crystallizing sodium oxalate in an amount which is at least equal to an amount of fresh sodium oxalate produced in the Bayer process from organic substances during bauxite digestion;
   e. separating the crystalline sodium oxalate, leaving an oxalate depleted liquor; and,
   f. combining the depleted liquor with the spent liquor for return to the bauxite digestion step.

2. The process of claim 1, further comprising:
   a. adding an organic polymer to the caustic aluminate liquor in the aluminum trihydroxide precipitation circuit before removal of the precipitated aluminum trihydroxide to stabilize against sodium oxalate crystallization.

3. A process according to claim 1 wherein the removed aluminum trihydroxide of the precipitation circuit is washed until the measured sodium oxalate content is ≦0.05%.

4. A process according to claim 1 wherein the amount of sodium oxalate seed crystals added in the side-stream crystallization is at least 10 times the amount of sodium oxalate crystallized.

5. A process according to claim 1 wherein side-stream crystallization is carried out for about 30 min. to 20 hours at a temperature of about 50–65° C.

6. A process according to claim 2 wherein an organic polymer is added in an amount sufficient to prevent stimulated nucleation of sodium oxalate by the washed aluminum trihydroxide.

7. A process according to claim 6 wherein the organic polymer is sodium polyacrylate added in an amount of up to about 60 mg/l of caustic aluminate liquor.

* * * * *

UNITED STATES PATENT AND TRADEMARK OFFICE
CERTIFICATE OF CORRECTION

PATENT NO. : 4,999,170
DATED : March 12, 1991
INVENTOR(S) : Neil Brown

It is certified that error appears in the above—identified patent and that said Letters Patent is hereby corrected as shown below:

Column 11, line 4, should read:

". . . superior in that (a) no liquor evaporation is required . . ."

Signed and Sealed this

Second Day of March, 1993

Attest:

STEPHEN G. KUNIN

Attesting Officer

Acting Commissioner of Patents and Trademarks